United States Patent Office 3,164,368
Patented Jan. 5, 1965

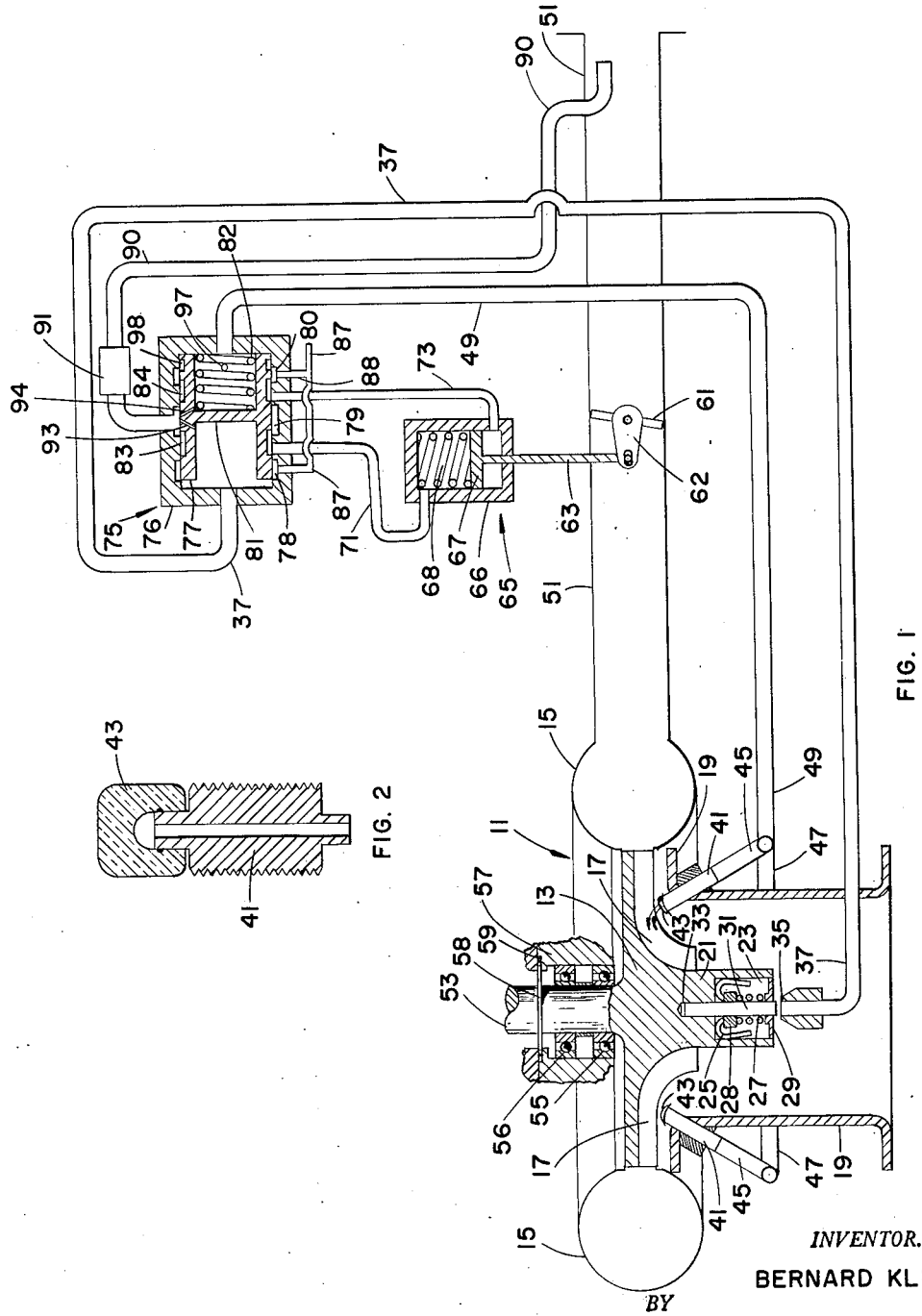

3,164,368
GAS TURBINE CONTROL
Bernard Klein, Clinton, N.Y., assignor to The Bendix Corporation, Utica, N.Y., a corporation of Delaware
Filed May 28, 1962, Ser. No. 198,199
3 Claims. (Cl. 253—52)

This invention relates to gas turbine control and more particularly concerns a gas turbine having a shut-down valve and pneumatic safety control means for operating the shut-down valve.

An object of the present invention is to provide a gas turbine system wherein control means will close valve means when the turbine begins to rotate eccentrically whereby damage to the turbine and associated equipment will be prevented.

Another object is to provide such a gas turbine control system having releasible vent means connected to pneumatic means arranged to be actuated by an eccentrically rotating turbine which results at the beginning of a bearing failure.

A further object is the provision of such a turbine control system in which frangible tips of vent means are broken off by eccentric rotation of a radial-flow turbine and the gas escape from the vent means causes a pneumatic valve to operate a piston actuator which closes the shut-down valve.

An additional object of the present invention is to provide a single pneumatic safety arrangement to give shut-down of a turbine in the event of either eccentric rotation or overspeed.

The realization of the above objects, along with features and advantages of the invention will be apparent from the following detailed description and the accompanying drawing in which:

FIGURE 1 is a diagrammatic representation of an embodiment of the invention and shows a radial-flow turbine and one vent means actuated as would occur with eccentric rotation with the vent means connected to pneumatic means which has closed a butterfly valve in the gas supply pipe and FIGURE 2 is a cross-sectional view of a threaded tube having a frangible glass tip which is used as part of vent means schematically shown in FIGURE 1 in which a glass tip is shown as broken off for escape of gas.

Referring to FIGURE 1 of the drawing, the turbine 11 which includes a radial-flow turbine wheel 13, an annular manifold 15 for directing air to the peripheral inlet ends of the curved blades 17 of the turbine wheel 13 and a tubular exhaust duct 19 encasing the side of the turbine wheel 13 which has blades 17 and an axial projection 21. Projection 21 has an axial recess 23 which contains a plurality of J-shaped fly weights 25, a spring 27 confined by plunger shoulder 28 and by cover 29 and biasing the shoulder 28 against inner ends of the fly weights 25 to resist centrifugal action, and a plunger 31 slidably-mounted in axial bore 33. The outer end of plunger 31 is closely-spaced (about 0.040 of an inch) from the open end 35 of vent conduit 37 to provide a restriction to flow. This spacing on the drawing is enlarged for clarity. Two steel tubes of four equi-spaced tubes 41 having frangible glass tips 43 are shown extending through the exhaust duct 19 so that the tips 43 are closely-spaced to the edges of the blades 17. The clearance (not shown to scale) is about 0.015 of an inch at a wheel radius of about two and quarter inches. A plurality of at least three equi-spaced tubes 41 are required. These tubes 41 connect via short conduits 45 to an annular tube 47 (surrounding the exhaust duct) which connects at the right to an escape conduit 49. An air supply pipe 51 connects to the manifold 15. The upper or other side of the turbine wheel 13 has a support shaft 53 extending axially and being mounted in two spaced ball bearings 55 and 56 which are supported in housing support structure 57. The shaft 53 is shown with a thin collar 58 received with appreciable bottom clearance in groove 59 in support structure 57 to suggest a turbine wheel normally having a fixed plane of rotation in the absence tilting due to bearing failure. It is to be noted that the right glass tip 43 of tube 41 is shown broken as if the turbine wheel 13 had rotated slightly eccentrically and arrows suggest the escape of air to the exhaust duct 19 from escape conduit 49.

To the right of the turbine 11, a butterfly valve 61 is mounted in supply pipe 51 with its operating arm 62 connected to a piston rod 63 of a piston actuator 65. This actuator has a cylindrical housing 66, a piston 67 connected to rod 63, and a spring 68 above the piston 67 urging it downwardly. It is to be noted that, before air pressure is available and applied to the bottom of piston 67, the spring 68 normally positions the piston so that the butterfly valve 61 is in closed position, as shown). This provides an automatic check of actuator operability at start up.

A first pipe 71 connects to the top interior of piston housing 66 above piston 67 and a second pipe 73 similarly connects below the piston 67. Both of these pipes extend to a control valve 75 having a cylindrical housing 76 and a piston sleeve 77 slidably mounted therein. The interior side surface of the valve housing 76 has a left annular recess 78, a central annular recess 79, and a right annular recess 80. The piston sleeve 77 has centrally-located transverse piston wall 81 so that pressures at either side will act on the piston sleeve. Spring 82 is confined between piston wall 81 and the right end or wall of the valve housing 76 and urges sleeve 77 to the left with a small force. This right housing wall also has escape conduit 49 extending therethrough to the right interior of the housing 76. The left end housing wall has vent conduit 37 extending therethrough to the left housing interior. First pipe 71 connected to the top of the piston actuator 65 extends through the bottom part of the side wall of housing 76 opening between the left recess 78 and the central recess 79, while the second pipe 73 similarly extends through the housing between the central recess 79 and the right recess 80. The piston sleeve 77 has a left annular recess 83 shown overlapping the housing central recess 79 and the opening of pipe 71 but adapted, when the piston sleeve 77 moves to the left, to overlap this pipe opening and the left housing recess 78. The piston sleeve 77 also has a right annular recess 84 which as shown overlaps the opening of second pipe 73 and right recess 80 but which will overlap recess 79 and pipe 73 upon leftward sleeve movement. Left housing recess 78 has an atmospheric vent pipe 87 connected thereto and right housing recess 80 has a connecting pipe 88 opening into vent pipe 87.

With the piston sleeve 77 as shown and when pressurized air is supplied to the central housing recess 79 via pressuring pipe 90 having filter 91 and opening into air supply pipe 51 upstream of butterfly valve 61, it is clear that pressurized air flows through sleeve recess 83 and first pipe 71 to position to the piston actuator 65 and to close valve 61 (as shown). The underside of piston 67 is vented via second pipe 73, the right sleeve recess 84, the right housing recess 80 and the vent pipes 88 and 87. With the piston sleeve 77 moved to the left, it is apparent that piston actuator 65 is operated to open the butterfly valve 61 since, by the overlapping of the recesses and pipes, venting and pressurizing flow paths will be reversed.

In order to admit pressurized air to opposite sides of the sleeve piston 77, the top side wall of the sleeve piston 77 is provided with two inclined supply ports 93 and 94 opening respectively at the left side and right side of the sleeve piston wall 81 and having adjacent inlets which remain connected to the central housing recess 79. In the arrangement as shown, it is to be realized that the breaking off of the glass tip 43 has reduced the pressure on the right side of the sleeve piston 77 to atmospheric so that the pressure on the left side of the sleeve piston rapidly overcame the small force of spring 82. It is to be understood that the restriction formed between overspeed plunger 31 and the end 35 of vent line 37 is such as to retain ninety p.s.i.g. on the left side of sleeve 77, assuming an inlet pressure of one hunderd p.s.i.g. in supply pipe 51.

In order to move the sleeve piston 77 at overspeed when no glass tip has been broken off, a pressure (about eighty-five p.s.i.g.) is normally maintained on the right side of the piston sleeve 77. This is accomplished by means of an orifice 97 in the right part of the side wall of the sleeve 77. This orifice 97 is sized so that the bleed therethrough to annular sleeve groove 98 (continually connected to the left vent recess 80) will maintain a lower pressure and also prevent build-up, respectively during normally running or during overspeed shut-down. Thus, when the sleeve piston 77 is positioned leftward, orifice 97 bleeds through groove 98 to right vent recess 80. At overspeed when vent line 37 is blocked and the piston sleeve 77 is positioned as shown, a pressure build-up via port 94 (since escape line 49 is closed) is also prevented by bleeding through orifice 97. By suitably reversing the normal pressure unbalance with changes in the size of orifice 97 and the restriction at the end of plunger 31, it is apparent that spring 82 can be omitted.

In FIGURE 2 a threaded tube or hollow stud 41 is shown and has a glass tip 43 bonded thereto. The glass tip 43 has a recess facing the outlet of the tube 41 and is fitted over a reduced-diameter tube projection for bonding and support. It is apparent that a turbine blade will easily break off glass tips 43 upon slight eccentric rotation.

In start-up for normal operation and assuming an inlet pressure of one hundred p.s.i.g. is to be supplied, the butterfly valve 61 will be in closed position due to piston actuator spring 67 but will be moved immediately to open position upon pressurized hot air being supplied via conduit 90 to the pneumatic valve 75. The pressure on the left side of the piston sleeve 77 which is positioned to the left becomes ninety p.s.i.g. due to the restriction at the end 35 of vent conduit 37 and the plunger 31. The pressure on the right side of the piston sleeve 77 becomes eighty-five p.s.i.g. due to bleed off through the right orifice 97 to the annular groove 98 in the sleeve 77 and the connection to atmospheric vent line 87. Spring 82 exerts an eleven pound force so that a greater total force is exerted on the right side of the piston sleeve 77 and the sleeve 77 moves to the left limit providing inlet air to the bottom of the actuator piston 67 via the central valve housing recess 79, the right sleeve recess 84 and pipe 73. The top of the actuator piston 67 is vented via conduit 71, the left sleeve recess 83 and the left valve housing recess 78 which connects to vent line 87. With butterfly valve 61 thus opened, normal operation proceeds with suitable speed regulation of the turbine by other valve means and controls (not shown).

In the event of a slight eccentric rotation of the turbine wheel 13 due to the beginning of bearing failure resulting from a lubrication malfunction, for example, one of the frangible glass tips 43 will be broken off to provide large escape flow path through conduit 49 and the pressure on the right side of the sleeve piston 77 will be reduced to atmospheric pressure whereby the sleeve piston 77 will be moved to the right as shown by the maintained ninety p.s.i.g. on the left side of the sleeve piston 77. This action results in venting the lower side of the actuator piston 67 and pressurizing the upper side to close butterfly valve 61. Venting is provided by conduit 73, the right sleeve recess 84, the right housing recess 80, and vent line 87. Pressurizing is provided by central housing recess 79, the left sleeve recess 83 and pipe 71. It is apparent that with close spacing of frangible tips 43 and the rapid-acting pneumatic system, the beginning of eccentric rotation will shut down the turbine and thus prevent damage due to turbine fragments or escaping hot air and will minimize damage to the turbine wheel and exhaust duct.

In the event of turbine overspeed after a period of normal operation due to speed regulation failure or a disconnected load, the predetermined-speed-responsive plunger 31 will abut and close the end 35 of vent conduit 37. This will cause the pressure on the left side of the piston sleeve 77 to increase from ninety p.s.i.g. to a hundred p.s.i.g. (which is the inlet air pressure) since there is now no restricted vent path through conduit 37 for the air supplied from the housing recess 79 through passage 93 to the left side of the piston sleeve 77. As mentioned, it is to be noted that bleed orifice 97 opens into the right groove 98 of the piston sleeve 77 which overlaps the right housing recess 80 connected to vent line 87 whereby eighty-five p.s.i.g. is maintained on the right side of the piston sleeve 77. The spring 82 and right pressure are immediately overcome and the sleeve piston 77 assumes the position shown on the drawing with piston actuator 65 being vented and pressurized as above described with reference to eccentric rotation so that the butterfly valve 61 is closed as shown. Pressure build-up at the right side of sleeve piston 77 is prevented because of bleed orifice 97 and its vent connections maintain eighty-five p.s.i.g.

From the foregoing, it is apparent that a control for preventing damaging eccentric rotation is provided and that a single pneumatic control provides a safety shut down in the event of either eccentric rotation or overspeed.

It is to be understood that persons skilled in the art can make changes in the disclosed embodiment without departing from the invention set forth in the following claims.

What is claimed is:

1. A gas turbine and single pneumatic control therefor adapted to shut down the turbine in event of eccentric turbine rotation as a result of a bearing failure or in the event of overspeed of the turbine comprised of:
   a radial-flow turbine wheel having a shaft extending from one side and blades and an axial projection on the other side,
   bearing means supporting said turbine wheel shaft for normal rotation in a fixed transverse plane,
   a tubular exhaust duct encasing said turbine blades and said turbine axial projection,
   an annular manifold constructed and arranged to supply gas to said turbine blades,
   a gas supply pipe connected to said manifold and having a butterfly valve mounted therein,
   pneumatic means fluidly connected to said gas supply pipe upstream of said butterfly valve and constructed to open said butterfly valve when subject to a predetermined-pressurized gas from said gas supply pipe,
   a plurality of tubes projecting from said exhaust duct at least three equi-spaced locations and terminating in frangible tips adjacent the blades of said turbine wheels,
   said frangible tips sealing the ends of said tubes and being constructed to break when contacted by said blades upon eccentric rotation of said turbine wheel to provide an outlet for said tubes,
   vent conduit means connecting said tubes to said pneumatic means to provide a vent flow path from said pneumatic means to said exhaust duct when one of said frangible tips is broken,
   said pneumatic means being constructed to close said butterfly valve when said vent flow path is provided upon breaking of one of said frangible tips as a result of eccentric rotation of said turbine wheel, a gas escape conduit having an open end axially-aligned with and spaced from said axial projection of said turbine wheel, said gas escape conduit being connected to said pneumatic means to provide a gas escape flow path to said exhaust duct during normal operation, a speed-responsive plunger having centrifugal flyweights axially mounted in the projection of said turbine wheel, said plunger being movable to close said gas escape conduit when said turbine wheel rotates above a predetermined speed, said pneumatic means being constructed to close said butterfly valve when said plunger closes said gas escape conduit whereby said turbine is prevented from overspeeding.

2. A gas turbine and single pneumatic control therefor adapted to shut down the turbine in event of eccentric turbine rotation as a result of a bearing failure or in the event of overspeed of the turbine comprised of:

a radial-flow turbine wheel having a shaft extending from one side and blades and an axial projection on the other side, support means including two ball bearings supporting said turbine wheel shaft for normal rotation in a fixed transverse plane, a tubular exhaust duct encasing said turbine blades and said turbine axial projection, an annular manifold constructed and arranged to supply gas to said turbine blades, a gas supply pipe connected to said manifold and having a butterfly valve mounted therein, pneumatic means fluidly connected to said gas supply pipe upstream of said butterfly valve and constructed to open said butterfly valve when subject to a predetermined-pressurized gas from said gas supply pipe, a plurality of tubes projecting from said exhaust duct from at least three equi-spaced locations and terminating in frangible glass tips adjacent the blades of said turbine wheel, said frangible tips sealing the ends of said tubes and being constructed to break when contacted by said blades upon eccentric rotation of said turbine wheel to provide an outlet for said tubes, vent conduit means connecting said tubes to said pneumatic means to provide a vent flow path from said pneumatic means to said exhaust duct when one of said frangible tips is broken, said pneumatic means being constructed to close said butterfly valve when said vent flow path is provided upon breaking of one of said frangible tips as a result of eccentric rotation of said turbine wheel, a gas escape conduit having an open end axially-aligned with and spaced from said axial projection of said turbine wheel, said gas escape conduit being connected to said pneumatic means to provide a gas escape flow path to said exhaust duct during normal operation, a speed-responsive plunger having centrifugal flyweights axially mounted in the projection of said turbine wheel, said plunger being movable to close said gas escape conduit when said turbine wheel rotates above a predetermined speed, said pneumatic means being constructed to close said butterfly valve when said plunger closes said gas escape conduit whereby said turbine is prevented from overspeeding, said pneumatic means including piston actuator connected to said butterfly valve and including sleeve valve means arranged to pass gas to said piston actuator for normal opening and for closing in the event of eccentric rotation breaks one of said frangible tips or overspeed closes said gas escape conduit.

3. A gas turbine control comprised of:

a turbine housing defining a turbine wheel chamber, a turbine wheel having blades and a mounting shaft positioned in said turbine wheel chamber, ball bearing means supporting said turbine wheel mounting shaft so that said turbine wheel is normally maintained on a fixed rotating axis, said turbine housing chamber having defining a wall facing one side of said turbine wheel, gas supply structure having a flow path and constructed and arranged to direct gases from the flow path to the blades of said turbine wheel, a shut-down valve in said flow path and arranged to be moved between open position and closed position for permitting and stopping flow of gas in said flow path, pneumatic operating means operably connected to said shut-down valve and having a gas conduit connected to said flow path upstream of said shut-down valve, a plurality of tubular means having a glass tip projecting from said housing wall at equi-spaced locations, said tips being closely spaced to said turbine wheel so that the tips will be broken if said turbine wheel tilts from its normal plane of rotation, conduit means connecting said tubular means to said pneumatic operating means so that said pneumatic operating means will be vented when one of said frangible tips is broken by eccentric rotation of said turbine wheel, said pneumatic means normally positioning said shut-down valve in open position when subject to pressurized gas and arranged to close said shut-down valve when vented upon one of said frangible tips being broken whereby said turbine will be shut down when eccentric rotation occurs as a result of a failure of said bearing means, said turbine wheel having a centrifugally-operated plunger, a vent conduit having an opening facing the end of said plunger, said plunger when actuated at a predetermined speed of said turbine wheel being adapted to close the opening of said vent conduit, said vent conduit being connected to said pneumatic operating means, said pneumatic operating means being further constructed and arranged to close said shut-down valve when said vent conduit is closed by said plunger at a predetermined speed of said turbine wheel.

References Cited in the file of this patent

UNITED STATES PATENTS

| | | |
|---|---|---|
| 1,326,651 | Doran | Dec. 30, 1919 |
| 1,498,096 | Herr | June 17, 1924 |
| 1,634,897 | Davis | July 5, 1927 |
| 1,771,720 | Miller | July 29, 1930 |
| 1,921,903 | Bentley | Aug. 8, 1933 |
| 2,247,086 | Grube | June 24, 1941 |
| 2,959,029 | Best | Nov. 8, 1960 |
| 2,993,496 | Ackley | July 25, 1961 |
| 3,027,137 | Eggenberger | Mar. 27, 1962 |
| 3,032,315 | Birmann | May 1, 1962 |